(12) United States Patent
Veerla et al.

(10) Patent No.: US 9,274,901 B2
(45) Date of Patent: Mar. 1, 2016

(54) I/O REQUEST MIRRORING IN A CLUSTERED STORAGE SYSTEM

(71) Applicant: LSI CORPORATION, San Jose, CA (US)

(72) Inventors: Sridhar Rao Veerla, Bangalore (IN); Naveen Krishnamurthy, Bangalore (IN)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 156 days.

(21) Appl. No.: 14/085,465

(22) Filed: Nov. 20, 2013

(65) Prior Publication Data

US 2015/0143164 A1    May 21, 2015

(51) Int. Cl.
| | |
|---|---|
| *G06F 11/00* | (2006.01) |
| *G06F 11/16* | (2006.01) |
| *G06F 11/07* | (2006.01) |
| *G06F 11/20* | (2006.01) |
| *G06F 11/10* | (2006.01) |

(52) U.S. Cl.
CPC .......... *G06F 11/167* (2013.01); *G06F 11/0727* (2013.01); *G06F 11/1092* (2013.01); *G06F 11/1612* (2013.01); *G06F 11/2023* (2013.01); *G06F 11/2053* (2013.01)

(58) Field of Classification Search
CPC ... G06F 11/167; G06F 11/26; G06F 11/0727; G06F 11/1092; G06F 11/1612; G06F 11/1616; G06F 11/2005; G06F 11/201; G06F 11/202; G06F 11/2023; G06F 11/2053; G06F 11/2056; G06F 11/2089; G06F 11/2092
USPC ............ 714/6.3, 6.1, 6.2, 6.21, 6.23, 6.32, 42
See application file for complete search history.

(56) References Cited

U.S. PATENT DOCUMENTS

| | | | |
|---|---|---|---|
| 6,928,514 | B2 | 8/2005 | Chatterjee et al. |
| 7,644,136 | B2 | 1/2010 | Rose et al. |
| 7,886,182 | B1 * | 2/2011 | Coatney et al. .................. 714/3 |
| 8,316,180 | B2 | 11/2012 | Galloway et al. |
| 2005/0148891 | A1 * | 7/2005 | Yamashita ..................... 600/509 |
| 2008/0147934 | A1 * | 6/2008 | Nonaka et al. .................. 710/74 |
| 2009/0320042 | A1 * | 12/2009 | Thelen et al. ................. 719/312 |
| 2012/0192006 | A1 * | 7/2012 | Qi et al. ....................... 714/6.22 |

* cited by examiner

*Primary Examiner* — Joseph D Manoskey

(57) ABSTRACT

Clustered storage systems and methods are presented herein. One clustered storage system includes a logical volume comprising first and second pluralities of storage devices. The first plurality of storage devices is different from the second plurality of storage devices and includes at least the same data as the second plurality of devices. The storage system also includes a first storage node operable to process first I/O requests to the first plurality of storage devices and a second storage node communicatively coupled to the first storage node and operable to process second I/O requests to the second plurality of storage devices. An I/O request of the first I/O requests initiates a redirection condition that the first storage node detects. Then, based on the redirection condition, the first storage node directs the second storage node to process data of the I/O request.

20 Claims, 8 Drawing Sheets

I/O REQUEST MIRRORING IN A CLUSTERED STORAGE SYSTEM

FIELD OF THE INVENTION

The invention generally relates to field of clustered storage systems and mirroring input/output requests.

BACKGROUND

Clustered storage systems have "nodes" that operate on shared storage volumes (a.k.a. logical volumes) configured from storage devices, such as hard disk drives and solid-state drives, to store and manage data. In some persistent reservation implementations, one storage controller of a node has exclusive access to a particular set of storage devices in a logical volume and is able to issue input/output (I/O) requests to them. Another storage controller (e.g., a second storage controller in a second node) may be able to "see" those storage devices but not be able to issue I/O requests to them. Any I/O requests the second storage controller receives for those storage devices are processed through I/O shipping. That is, the I/O request is sent by the receiving storage controller to the storage controller that has exclusive access to those storage devices. In failover implementations, the storage controllers are redundant in case one storage controller fails such that I/O processing can continue on the redundant storage controller. In whatever form, I/O shipping is generally performed. I/O shipping is a computationally intensive process of receiving an I/O with one storage controller and transferring it to another storage controller while managing the acknowledgements and overhead with the originally receiving storage controller.

SUMMARY

Clustered storage systems and methods are presented herein that provide for I/O mirroring. In one embodiment, a clustered storage system includes a logical volume comprising first and second pluralities of storage devices. The first plurality of storage devices is different from the second plurality of storage devices and includes at least the same data as the second plurality of devices. The storage system also includes a first storage node operable to process first I/O requests to the first plurality of storage devices and a second storage node communicatively coupled to the first storage node and operable to process second I/O requests to the second plurality of storage devices. An I/O request of the first I/O requests initiates a redirection condition that the first storage node detects. Then, based on the redirection condition, the first storage node directs the second storage node to process data of the I/O request to mirror the data of the request.

The various embodiments disclosed herein may be implemented in a variety of ways as a matter of design choice. For example, the embodiments may take the form of computer hardware, software, firmware, or combinations thereof. Other exemplary embodiments are described below.

BRIEF DESCRIPTION OF THE FIGURES

Some embodiments of the present invention are now described, by way of example only, and with reference to the accompanying drawings. The same reference number represents the same element or the same type of element on all drawings.

DETAILED DESCRIPTION OF THE FIGURES

Figure 1:
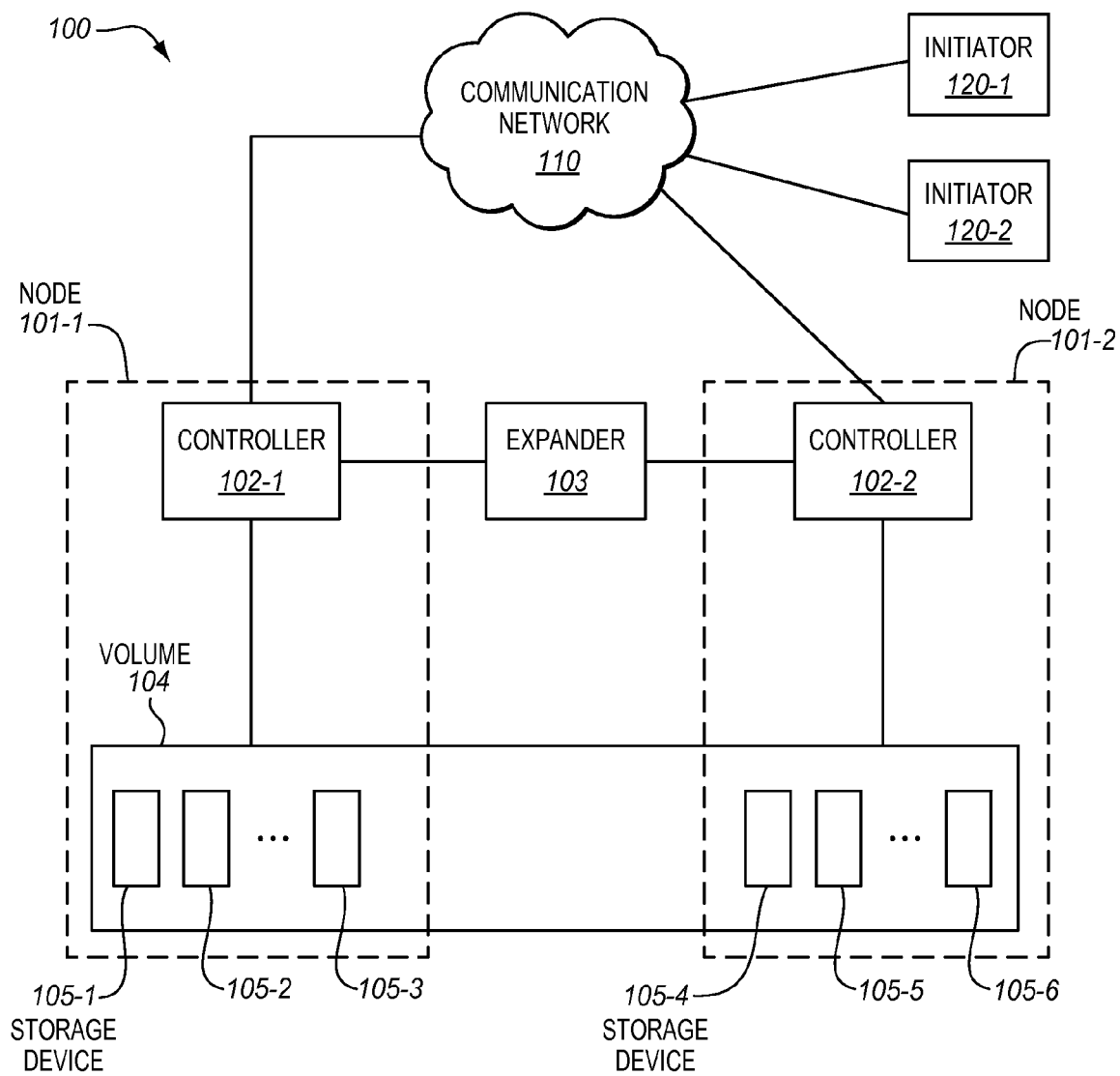
FIG. 1 is a block diagram of an exemplary clustered storage system comprising storage nodes that are each configured with a plurality of storage devices.

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention and are to be construed as being without limitation to such specifically recited examples and conditions. As a result, the invention is not limited to the specific embodiments or examples described below.

A storage system can be configured with a Redundant Array of Independent Disk (RAID) level 1 logical volume having a set of storage devices (e.g., disk drives) for data and another set of storage devices that mirror the data. I/O writes received by either storage controller are first written on the storage devices that the storage controller "owns". Then, the same data is written onto the mirrored storage devices owned by the peer storage controller. Generally, the storage devices that are part of a logical volume are independently owned by individual storage controllers. When an I/O request is received by a storage controller for the logical volume for storage devices it does not own, the processing of the I/O request is performed via I/O shipping to the peer storage controller. In this instance, the entire I/O request is transferred to the peer storage controller by the storage controller initially receiving the I/O request. The peer storage controller then processes the I/O request and informs the first storage controller (i.e., the storage controller initially receiving the I/O request) once it completes processing of the I/O request. But this process can be computationally intensive and time consuming because the I/O request may include a substantial amount of data and associated overhead.

Additionally, in persistent reservation implementations, a first storage controller can access the storages devices that are part of the logical volume and that are owned by the first storage controller. A second storage controller can access the storage devices that are part of the logical volume and that are owned by the second storage controller. When the first storage controller receives an I/O write request, the first storage controller writes the data to the storage devices that it owns and then sends a duplicated I/O request to the second storage controller. The second controller upon receiving the duplicated I/O request and writes the data of the request onto the storage devices that it owns. The logical volume is not owned exclusively by any particular storage controller. Rather, each storage controller owns a partial set of storage devices that are part of the logical volume.

When there are no failures, any read I/O request received by the first storage controller can be processed by the first storage controller and any read I/O request received by the second storage controller can be processed by the second storage controller. In other words, a read I/O request does not require I/O shipping. But, when the first storage controller loses the storage devices that it owns at or about the same time it receives an I/O request, it falls back to the traditional approach of shipping I/O requests in their entirety to the second storage controller, which in turn processes the requests because the second storage controller has a mirrored set of the storage devices that are part of the same logical volume.

In accordance with features and aspects herein, the second storage controller, upon detecting a failure of the first storage controller, automatically moves the ownership of the storage devices that are owned by the first storage controller to the second storage controller. In this case the second storage controller owns all the storage devices that are part of the logical volume (i.e. the original data storage devices that it owned as well as the storage devices that were part of this volume and owned by the failed controller). Upon the movement of ownership, the second storage controller may rebuild any data that was processed by it during the movement of ownership. The process for rebuilding this data can be based on any existing techniques of rebuilding of data of a logical volume of RAID level 1. But, this avoids a time consuming migration of the data of all of the devices of the failed controllers to new storage devices.

When a partial set of storage devices owned by the first storage controller is lost, the second storage controller picks up spare storage devices and rebuilds the data from the mirrored set since the mirrored set of those storage devices is available to the second storage controller. During the rebuild process, the second storage controller owns both the data storage devices as well as the mirrored set of storage devices on which the rebuild is in progress (i.e. the source and the destination data storage devices that are part of the rebuild). If the first storage controller receives an I/O request that falls on these storage devices, then the I/O is mirrored onto the second storage controller which in turn operates on the data of the I/O request and informs the first storage controller when that operation is completed. Once the rebuild is completed, the second storage controller informs the first storage controller to take the ownership of the newly rebuilt storage devices, assuming it is operable to do so (e.g., the failed storage controller could be replaced).

The embodiments herein overcome the problems associated with I/O shipping by configuring commands between the storage controllers that direct the storage controllers to operate on data from the I/O requests. Moreover, the embodiments herein allow for ownership of storage devices to be transferred such that data does not have to be completely rebuilt by a failover storage controller. For example, when a storage controller fails, ownership of the devices is transferred to the operational storage controller as opposed rebuilding data in the devices of the failed storage controller. Since the data from the failed storage controller is still good (i.e., uncorrupted), time consuming migration can be avoided.

Additionally, various forms of storage management techniques, such as RAID storage management may be implemented with the embodiments disclosed herein. In one embodiment, storage controllers of the storage nodes are MegaRAID storage controllers operable to provide a high availability solution that ensures availability of data in case of a failure of a node, storage controllers, storage devices, and/or SAS link to the storage devices. These inventive aspects thereby reduce failover time and achieve active-active I/O processing in a clustering solution by distributing storage devices of an array across multiple storage nodes. Active-active configurations enable two or more storage controller nodes to process I/O requests, and provide a standby capability for the other(s).

FIG. 1 is a block diagram of an exemplary clustered storage system 100 comprising storage nodes 101-1 and 101-2, each configured with a plurality of storage devices 105. Each storage node 101 is operable to store and manage data in a storage volume 104 configured from the storage devices 105. In this regard, the storage nodes 101-1 and 101-2 process I/O requests from a variety of initiators 120 to their respective storage devices 105 in the storage volume 104. For example, the storage node 101-1 is operable to process I/O requests via the storage controller 102-1 to the storage volume 104 while the storage node 101-2 is also operable to process I/O requests to the storage volume 104 via the storage controller 102-2. The storage controllers 102-1 and 102-2 perform I/O mirroring to update the mirrored data onto the storage devices 105 that they own. If a processing error occurs (e.g., a failure in a particular storage node 101 or a failure of storage devices), then a storage node 101 can generate a command that directs another storage node 101 to operate on the data of the I/O request.

I/O mirroring herein is a method of I/O processing where one storage node 101-1 operates on data on behalf of another storage node without the overhead and computational complexity associated with I/O shipping. For example, one storage node 101-1 may receive a write I/O request intended for storage devices 105 owned by the storage node 101-2. The storage node 101-1 retrieves the data from the I/O request and configures a command with the data that directs the storage node 101-2 to write the data at the location designated in the original write I/O request. The command, however, is not a transfer of the original I/O request. Rather, it is a simplified command between storage controllers 102 that allows for data transfers between the storage controllers 102 without the overhead of the original I/O request. The storage nodes 101-1 and 101-2 are communicatively coupled to one another (e.g., through a storage expander 103) to perform this I/O mirroring.

In one embodiment, the storage system 100 is a persistent reservation implementation in which the storage controller 102-1 of the storage node 101-1 has I/O and configuration control over the storage devices 105-1-105-3 of the storage volume 104. The storage node 101-2 has I/O and configuration control over its storage devices 105-4-105-6. The storage controller 102-1 can "see" the storage devices 105-4-105-6 but does not have access to the storage devices 105-4-105-6. Similarly, the storage node 101-2 can see the storage devices 105-1-105-3 without having access to those storage devices. For example, when the logical volume 104 is a Raid Level 1 logical volume, any I/O write request written onto a region of the storage devices 105-1-105-3 is mirrored on the counter part of the Raid Level 1 logical via the storage devices 101-4-101-6. The I/O mirroring techniques described herein allow one storage node 102-1 to act on behalf of the other storage node 102-2 for an I/O request to the storage devices 105-4-105-6 under control of the other storage node 102-2, and vice versa.

During a failover, the storage node 101-1 performs I/O mirroring and operates on data on behalf of the storage node 101-2 when the storage node 101-2 is incapable of processing I/O requests to its storage devices 105-4-105-6 (e.g., either due to the failure of the storage controller 102-2 or due to the failure of one or more the storage devices 105-4-105-6). Similarly, the storage node 101-2 operates on data on behalf of the storage node 101-1 when the storage node 101-1 experiences a failure.

As illustrated, the storage nodes 101-1 and 101-2 are communicatively coupled to the initiators 120-1 and 120-2 through a communication network 110. The communication network 110 is any network capable of transferring data between the storage nodes 101 and the initiators 120. Examples of such include the Internet, local area networks, wide-area networks, and switched fabric's implemented by various storage systems (e.g., via storage expanders such as the storage expander 103.

The storage nodes 101 may be configured in a variety of ways as a matter of design choice to process the I/O requests from the initiators 120. One example of the storage nodes 101 includes computer network servers that communicate with the initiators 120-1-120-2 through the Internet. The storage nodes 101 can be configured within the same server or within different servers. The storage controllers 102 are any devices, systems, software, or combinations thereof operable to perform I/O processing to the storage devices 105 of their respective storage nodes 101 and to perform I/O mirroring for the storage nodes 101. Examples of the storage controllers 102 include Serial Attached Small Computer System Interface (SAS) storage controllers and Peripheral Computer Interface Express (PCIe) storage controllers. Examples of the storage devices include hard disk drives and solid-state drives.

As mentioned, the storage controllers 102-1 and 102-2 are communicatively coupled to one another to perform I/O mirroring and may be communicatively coupled to one another via the storage expander 103. Examples of the storage expander 103 include SAS expanders that are operable to expand a number of SAS devices (e.g., storage devices 105, other storage expanders, and/or storage controllers 102) in a SAS topology. In this regard, the invention is not intended to be limited to any particular number of storage nodes 101, storage controllers 102, storage devices 105 or the like.

Figure 2:
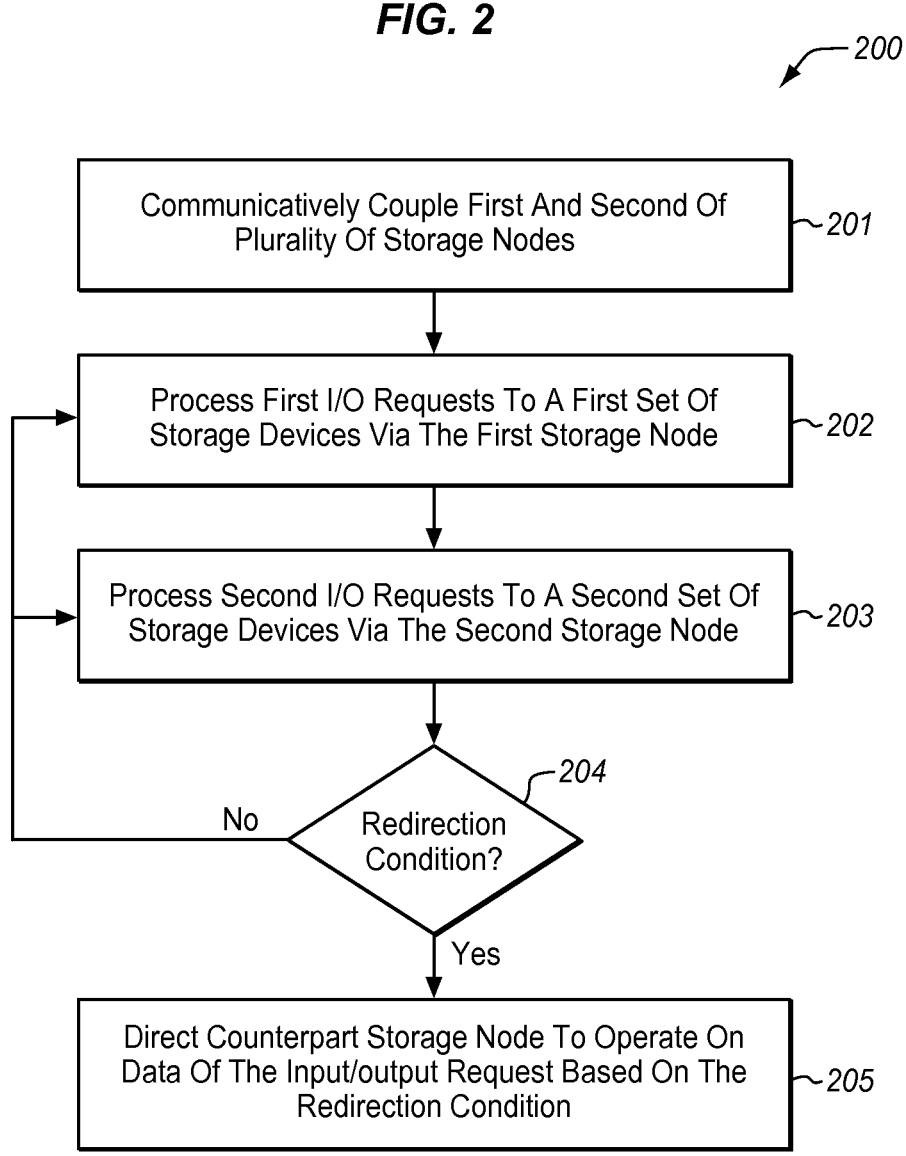
FIG. 2 is a flowchart of an exemplary process of the storage system of FIG. 1.

The general inventive concepts of the storage system 100 are now discussed with respect to the flowchart of FIG. 2. FIG. 2 is a flowchart of an exemplary process 200 of the clustered storage system 100. In this embodiment, it is generally presumed that the storage nodes 101-1 and 102 are communicatively coupled to one another (process element 201) and are processing I/O requests. Thus, in the process element 202, the storage node 101-1 is processing first I/O requests to a storage volume 104 via the storage controller 102-1 and, in the process element 203, the storage node 101-2 is processing second I/O requests to the storage volume 104 via the storage controller 102-2. For a write I/O request, the storage controller 102-1 writes the data to the first set of storage devices 105-1-105-3 of the storage volume 104. The storage controller 102-1 also sends a mirror data request to the storage controller 102-2 that directs the storage controller 102-2 to process the data (e.g., write) of the I/O request to its storage devices 105-4-105-6. This process also happens in the opposite direction.

It should be noted that for a read request each of the storage controllers can process the I/O requests independently. For example, the storage node 101-1 processes a read I/O request from its storage devices 105-1-105-3 but it is not necessary to direct the storage node 101-2 to do the same as it can complete similar read I/O requests from its storage devices 105-4-105-6.

The storage nodes 101-1 and 101-2 continue processing the I/O requests through their respective storage controllers 102-1 and 102-2 until one or more of the storage controllers 102 detects a redirection condition, in the process element 204. This redirection condition may be the result of a failover or a write I/O request to storage devices 105 not owned by a storage controller 102. For example, the storage controller 102-1 may receive an I/O request for the storage volume 104 where the storage devices 105-1-105-3 are not available. In a persistent reservation implementation, the storage controller 102-1 would be unable to access the storage devices 105-4-105-6 which are the mirror counter parts of 105-1-105-3, under control of the storage controller 102-2. Accordingly, the storage controller 102-1 forwards the command to the storage controller 102-2 through the communicative coupling between the storage controllers 102-1 and 102-2 to direct the storage controller 102-2 to operate on the data of the I/O request, in the process element 205.

In the event of a "failover", the storage controller 102-1 may detect that it is incapable of performing I/O requests to its storage devices 105-1-105-3 (e.g., due to a firmware failure of the storage controller 102-1, such as a mapping error, and/or a failure of one or more of its storage devices 105-1-105-3). Accordingly, the storage controller 102-1 may determine that the failover initiates the redirection condition. Then, the storage controller 102-1 directs the storage controller 102-2 to perform the data operations of the I/O request within its storage devices 105-4-105-6, in the process element 205. The storage controller then takes ownership of the operational storage devices.

To configure a command to process the data of the I/O request, the storage controller 102-1 may process an I/O request, extract the data from the I/O request, and transfer the data of the I/O request to the storage controller 102-2 with instructions that direct the storage controller 102-2 to write the data to one or more of its storage devices 105-4-105-6 in the storage volume 104. The storage controller 102-1 may then acknowledge completion of the write I/O request to the appropriate initiator 120 after the storage controller 102-2 writes the data. Specific persistent reservation implementations and failover implementations as discussed are shown and described below in FIGS. 3-7

Figure 3:
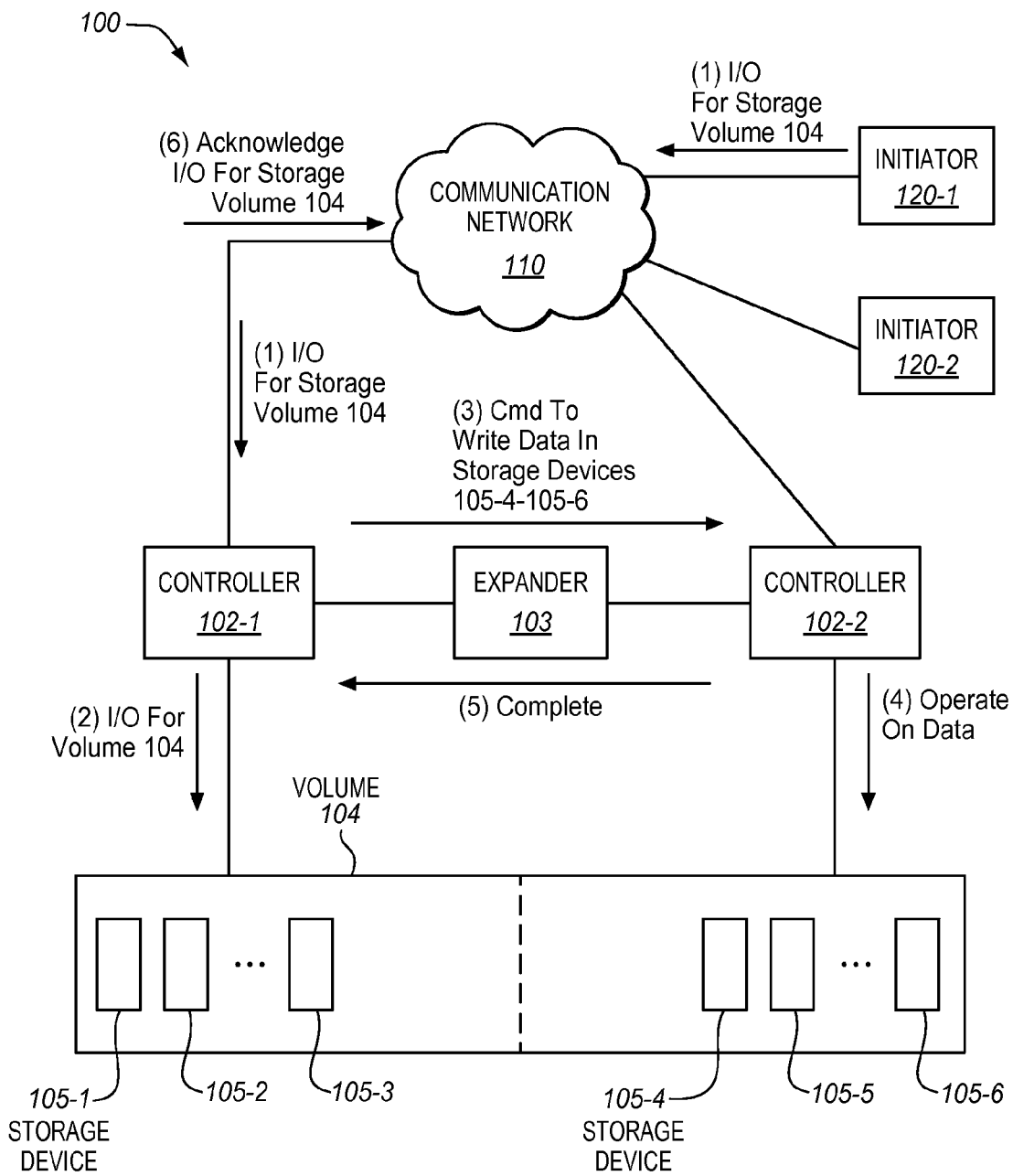
FIG. 3 is a block diagram of the clustered storage system implementing I/O mirroring in a persistent reservation configuration.

FIG. 3 is a block diagram of the clustered storage system 100 implementing I/O mirroring in a persistent reservation configuration. In this persistent reservation embodiment, an example of the I/O processing is presented with the initiator 120-1 transferring an I/O request (1) to the storage controller 102-1 through the communication network 110 for an operation on data residing in the storage volume 104.

If the I/O request to the storage volume 104 is a write request, the storage controller 102-1 extracts the data from the I/O request and determines which of the storage devices 105-1-105-3 the data needs to be written to and then writes the data (2) to the appropriate locations in one or more of the storage devices 105-1-105-3. At the same time the storage controller 102-1 forms a mirror command (3) and sends the command through the expander 103 to the storage controller 102-2 that directs the storage controller 102-2 to operate on the data (3) pertaining to the I/O request (1). The storage controller 102-2 writes the data to the appropriate locations in one or more of the appropriate storage devices 105-4-105-6 as specified in command (3). The storage controller 102-2 acknowledges to the storage controller 102-1 that the data operation is complete (5) such that the storage controller 102-1 can acknowledge completion (5) of the I/O request for the storage volume 104 to the requesting initiator 120-1. This process also works in the opposite direction (i.e., for any write request received by the storage controller 102-2, which mirrors it onto storage controller 102-2).

If the I/O request to the storage volume 104 is a read request, the storage controller 102-1 determines from the I/O request where the data is located on the storage devices 105-1-105-3 and completes the request. In this case there is no involvement of the storage controller 102-2 and the storage devices 105-4-105-6. Similarly If the I/O read request is received by the storage controller 102-2, then the storage controller 102-2 processes the request from the storage devices 105-4-105-6 without the involvement of storage controller 102-1 and its storage devices 105-1-105-3.

Figure 4:
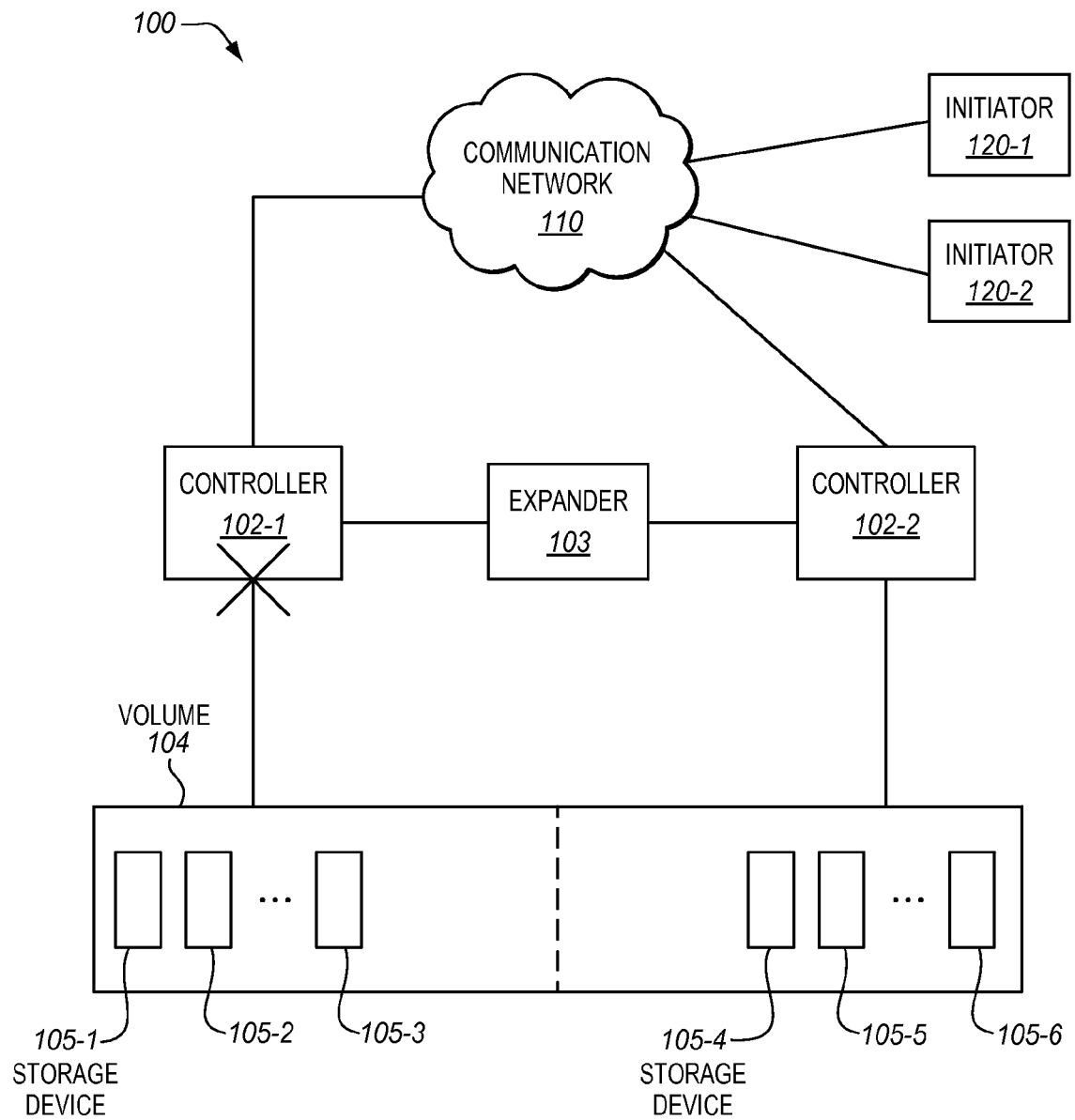
FIGS. 4 and 5 are block diagrams illustrating I/O mirroring in the event of a node failure in the clustered storage system.
Figure 5:
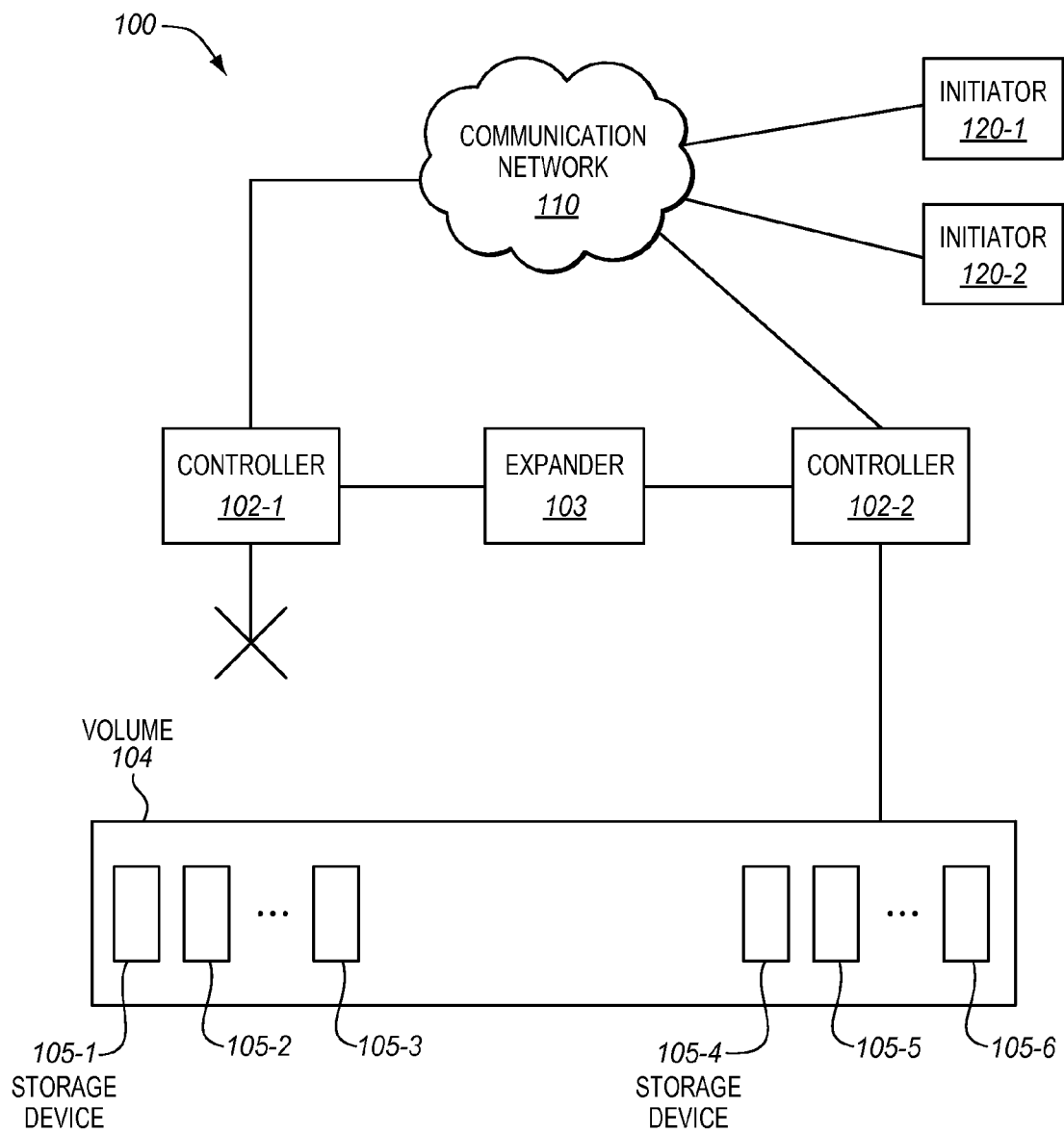

FIGS. 4 and 5 are block diagrams illustrating an example of I/O mirroring in the event of a node failure in the clustered storage system 100. In this example, the storage controller 102-1 of the storage node 101-1 is a redundant storage controller for the storage controller 102-2 of the storage node 101-2. Accordingly, the data contained on the storage devices 105-1-105-3 is a duplicate of the data contained on the storage devices 105-4-105-6. The I/O requests to the storage controller 102-1 in this example are similar to the I/O requests to the storage controller 102-2. That is, the I/O requests to the storage controller 102-1 include the same references to data as the I/O requests to the storage controller 102-2 although the data of the I/O requests to the storage controller 102-1 is located in the storage devices 105-1-105-3 and the data of the I/O requests to the storage controller 102-2 is located in the storage devices 105-4-105-6.

When the storage controller 102-1 fails, as illustrated in FIG. 4, I/O requests to the storage devices 105-1-105-3 cannot be processed. However, as the data on the storage devices 105-4-105-6 is a duplicate of the data on the storage devices 105-1-105-3, the storage controller 102-2 can continue processing I/O requests for the storage volume 104 using the storage devices 105-4-105-6 without corrupting the data.

When storage controller 102-2 detects that storage controller 102-1 failed, the storage controller 102-2 performs the failover operation and takes "ownership" of the storage devices 105-1-105-3 as illustrated in FIG. 5. Then, the storage controller 102-2 may rebuild any data that was written to the storage volume 104 where the data was only updated to the storage devices 105-4-105-6. That is, after taking ownership, the storage controller 102-2 may rebuild the storage devices 105-1-105-3 from the storage devices 105-4-105-6 because the storage controller 102-2 continues processing I/O requests to its storage devices 105-4-105-6 (e.g., as the storage system remains operational). After the failover and rebuild operations are complete, the storage controller 102-2 owns the storage devices 105-1-105-6. Afterwards, the I/O requests can be processed as a RAID Level 1 volume. For example, for a write I/O request, data is written onto both the mirror sets of storage devices (e.g., storage devices 105-1-105-3) and the data storage devices 105-4-105-6. Read I/O requests can be serviced from either of the mirror or data sets.

To direct the storage controller 102-2 to write the data, the storage controller 102-1 may generate a command that includes the location of where the data is to be written in the storage devices 105-1-105-3, as discussed above. The storage controller 102-1 may then transfer that command through the expander 103 along with the data that was extracted from the I/O request to the storage controller 102-2. Such commands can be configured from SAS and/or PCIe messaging between comparable devices. For example, a SAS storage controller may communicate with another SAS storage controller through the SAS expander 103 to direct the SAS storage controller to perform some operation. This messaging can be used to mimic an I/O request to a SAS storage controller 102-2 by creating an indirect I/O link to a SAS storage controller 102-2. Similar operations may be performed for PCIe (e.g., some SAS storage controllers are now configured with PCIe communications and tunnel through SAS channels).

Figure 6:
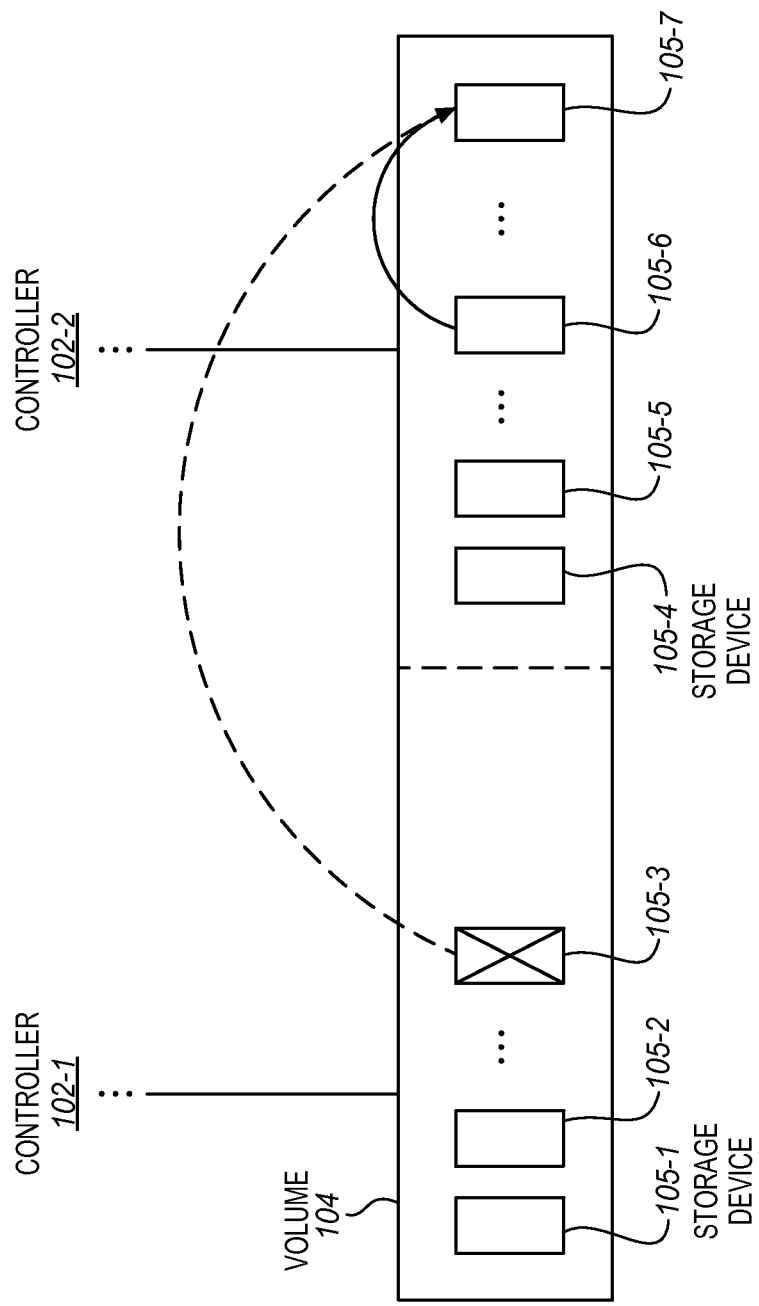
FIGS. 6 and 7 are block diagrams illustrating I/O mirroring in the event of a storage device failure in the clustered storage system.
Figure 7:
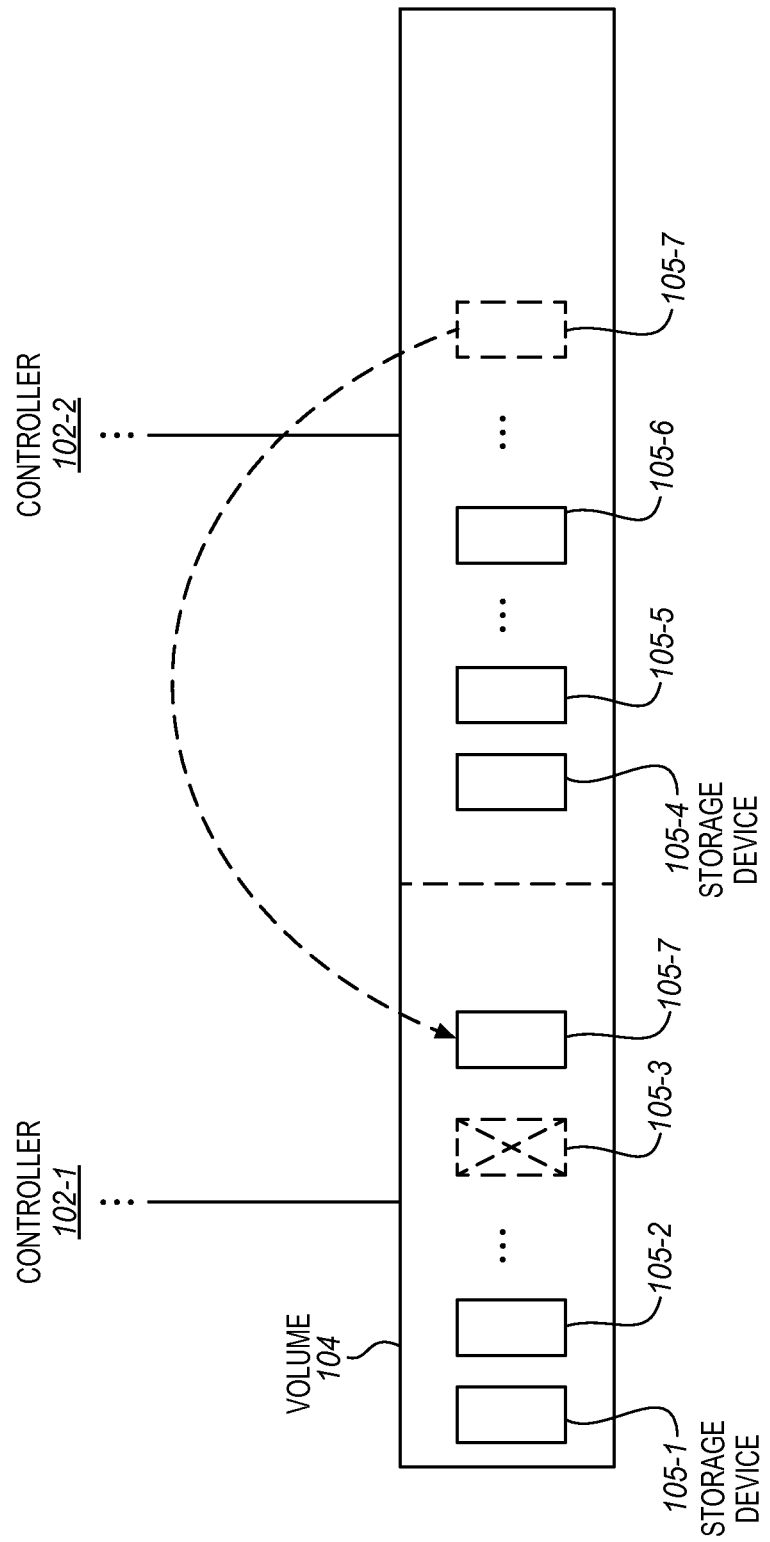

FIGS. 6 and 7 are block diagrams illustrating I/O mirroring in the event of a storage device 105 failure in the clustered storage system 100. In this example, one of the storage devices 105-3 under the control of the storage controller 102-1 fails for whatever reason (e.g., a communication error, a disk crash, etc.), as illustrated in FIG. 6. As the storage controller 102-1 can no longer operate on the data of the storage device 105-3, the storage controller 102-1 may direct the storage controller 102-2 to allocate space in a storage device 105-7 (e.g., a spare storage device) under control of the storage controller 102-2. From there, the storage controller 102-2 may copy the data from the storage device 105-6 to the storage device 105-7, thereby replicating the data from the storage device 105-3 in a storage device 105 that is under the control of the storage controller 102-2. During this time, however, I/O requests to the storage device 105-6 via the storage controller 102-2 can continue. And, any I/O requests to the storage device 105-3 via the storage controller 102-1 can be configured with a command by the storage controller 102-1 to the storage controller 102-2 that directs the storage controller 102-2 to operate on the data in the storage device 105-7. The mimicked/mirrored I/O requests via the command from the storage controller 102-1 thereby maintain the redundancy albeit without any delay that may be caused by rebuilding/recreating the storage device 105-3 in the storage device 105-7.

As illustrated In FIG. 7, once the rebuild operation is completed for the storage device 105-7, the ownership of 105-7 is moved to the storage controller 102-1. The storage device 105-7 then functions as a replacement for the storage device 105-3. Afterwards, I/O requests to the storage controller 102-1 for the storage device 105-3 can be processed by storage controller 102-1 using the storage device 105-7.

Figure 8:
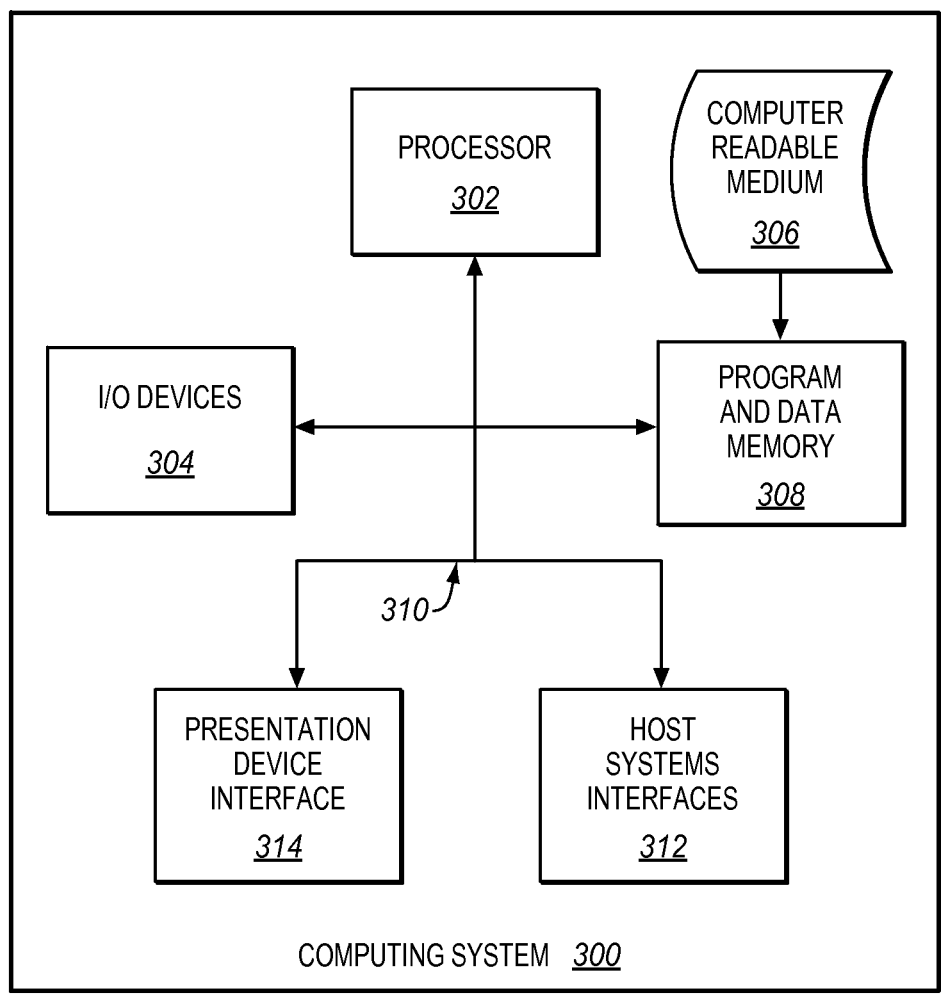
FIG. 8 is a block diagram of an exemplary computing system in which a computer readable medium provides instructions for performing methods herein.

The invention can take the form of an entirely hardware embodiment, an entirely software embodiment or an embodiment containing both hardware and software elements. In one embodiment, the invention is implemented in software, which includes but is not limited to firmware, resident software, microcode, etc. FIG. 8 illustrates a computing system 300 in which a computer readable medium 306 may provide instructions for performing any of the methods disclosed herein.

Furthermore, the invention can take the form of a computer program product accessible from the computer readable medium 306 providing program code for use by or in connection with a computer or any instruction execution system. For the purposes of this description, the computer readable medium 306 can be any apparatus that can tangibly store the program for use by or in connection with the instruction execution system, apparatus, or device, including the computer system 300.

The medium 306 can be any tangible electronic, magnetic, optical, electromagnetic, infrared, or semiconductor system (or apparatus or device). Examples of a computer readable medium 306 include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

The computing system 300, being suitable for storing and/or executing program code, can include one or more processors 302 coupled directly or indirectly to memory 308 through a system bus 310. The memory 308 can include local memory employed during actual execution of the program code, bulk storage, and cache memories which provide temporary storage of at least some program code in order to reduce the number of times code is retrieved from bulk storage during execution. I/O devices 304 (including but not limited to keyboards, displays, pointing devices, etc.) can be coupled to the system either directly or through intervening I/O controllers. Network adapters may also be coupled to the system to enable the computing system 300 to become coupled to other data processing systems, such as through host systems interfaces 312, or remote printers or storage devices through intervening private or public networks. Modems, cable modem and Ethernet cards are just a few of the currently available types of network adapters.

What is claimed is:

1. A storage system, comprising:
   a logical volume comprising first and second sets of storage devices, wherein the first set of storage devices is different from the second set of storage devices and includes at least the same data as the second set of storage devices,
   a first storage node operable to process input/output (I/O) requests from an initiator that are directed to the first set of storage devices; and
   a second storage node communicatively coupled to the first storage node and operable to process I/O requests that are from the initiator and are directed to the second set of storage devices,
   wherein the second storage node is operable to assume ownership of the first set of storage devices in response to detecting a redirection condition indicating a failover, and to update the first set of storage devices based on I/O requests that are directed to the second set of storage devices.

2. The storage system of claim 1, wherein:
   the second storage node is further operable to update the first set of storage devices with data from I/O requests directed to the second set of storage devices.

3. The storage system of claim 1, wherein:
   the first storage node is further operable to detect a failure of one of the first set of storage devices, and to direct the second storage node to copy data from the second set of storage devices, corresponding to Logical Block Addresses (LBAs) stored by the failed storage device, into a spare storage device.

4. The storage system of claim 3, wherein:
   the first storage node is further operable to assume control of the spare storage device and to process I/O requests directed to the first set of storage devices by updating the spare storage device.

5. The storage system of claim 3, wherein:
   the first storage node is further operable to direct the second storage node to update the spare storage device based on I/O requests directed to the first set of storage devices.

6. The storage system of claim 1, wherein:
   the second storage node is further operable to update the first set of storage devices with data that was previously applied to the second set of storage devices.

7. The storage system of claim 6, wherein:
   the first storage node is further operable to generate a command for the second storage node based on a received I/O request, and to acknowledge processing of the received I/O request to an initiator of the received I/O request.

8. A method operable in the storage system comprising a plurality of storage nodes, the method comprising:
   communicatively coupling first and second storage nodes of the plurality of storage nodes;
   processing input/output (I/O) requests from an initiator that are directed to a first set of storage devices of a logical volume via the first storage node;
   processing I/O requests that are from the initiator and are directed to a second set of storage devices of the logical volume via the second storage node,
   wherein the first set of storage devices is different from the second set of storage devices and includes at least the same data as the second set of devices,
   operating the second storage node to assume ownership of the first set of storage devices in response to detecting a redirection condition indicating a failover; and
   updating the first set of storage devices based on I/O requests that are directed to the second set of storage devices.

9. The method of claim 8, further comprising:
   operating the second storage node to update the first set of storage devices with data from I/O requests directed to the second set of storage devices.

10. The method of claim 8, wherein:
    the method further comprises, via the first storage node:
    detecting a failure of one of the first set of storage devices; and
    directing the second storage node to copy data from the second set of storage devices, corresponding to Logical Block Addresses (LBAs) stored by the failed storage device, into a spare storage device.

11. The method of claim 10, further comprising, via the first storage node:
    assuming control of the spare storage device; and
    processing I/O requests directed to the first set of storage devices by updating the spare storage device.

12. The method of claim 10, further comprising, via the first storage node:
    directing the second storage node to update the spare storage device based on I/O requests directed to the first set of storage devices.

13. The method of claim 8, further comprising:
    operating the second storage node to update the first set of storage devices with data that was previously applied to the second set of storage devices.

14. The method of claim 13, further comprising, via the first storage node:
    generating a command for the second storage node based on a received I/O request; and
    acknowledging processing of the received I/O request to an initiator of the received I/O request.

15. A non-transitory computer readable medium comprising instructions that, when executed in a storage system comprising a plurality of storage nodes, direct at least first and second storage nodes of the plurality of storage nodes to:
    communicatively couple the first and second storage nodes;
    process input/output (I/O) requests from an initiator that are directed to a first set of storage devices of a logical volume via the first storage node;
    process I/O requests that are from the initiator and are directed to a second set of storage devices of the logical volume via the second storage node,
    wherein the first set of storage devices is different from the second set of storage devices and includes at least the same data as the second set of devices,
    operate the second storage node to assume ownership of the first set of storage devices in response to detecting a redirection condition indicating a failover; and update the first set of storage devices based on I/O requests that are directed to the second set of storage devices.

16. The computer readable medium of claim 15, wherein the instructions further direct the second storage node to:
operate the second storage node to update the first set of storage devices with data from I/O requests directed to the second set of storage devices.

17. The computer readable medium of claim 15, wherein the instructions further direct the first storage node to:
detect a failure of one of the first set of storage devices; and
direct the second storage node to copy data from the second set of storage devices, corresponding to Logical Block Addresses (LBAs) stored by the failed storage device, into a spare storage device.

18. The computer readable medium of claim 17, further comprising instructions that direct the first storage node to:
assume control of the spare storage device; and
process I/O requests directed to the first set of storage devices by updating the spare storage device.

19. The computer readable medium of claim 17, further comprising instructions that direct the first storage node to:
direct the second storage node to update the spare storage device based on I/O requests directed to the first set of storage devices.

20. The computer readable medium of claim 15, wherein the instructions further direct the second storage node to:
update the first set of storage devices with data that was previously applied to the second set of storage devices.

* * * * *